United States Patent Office 3,380,747
Patented Apr. 30, 1968

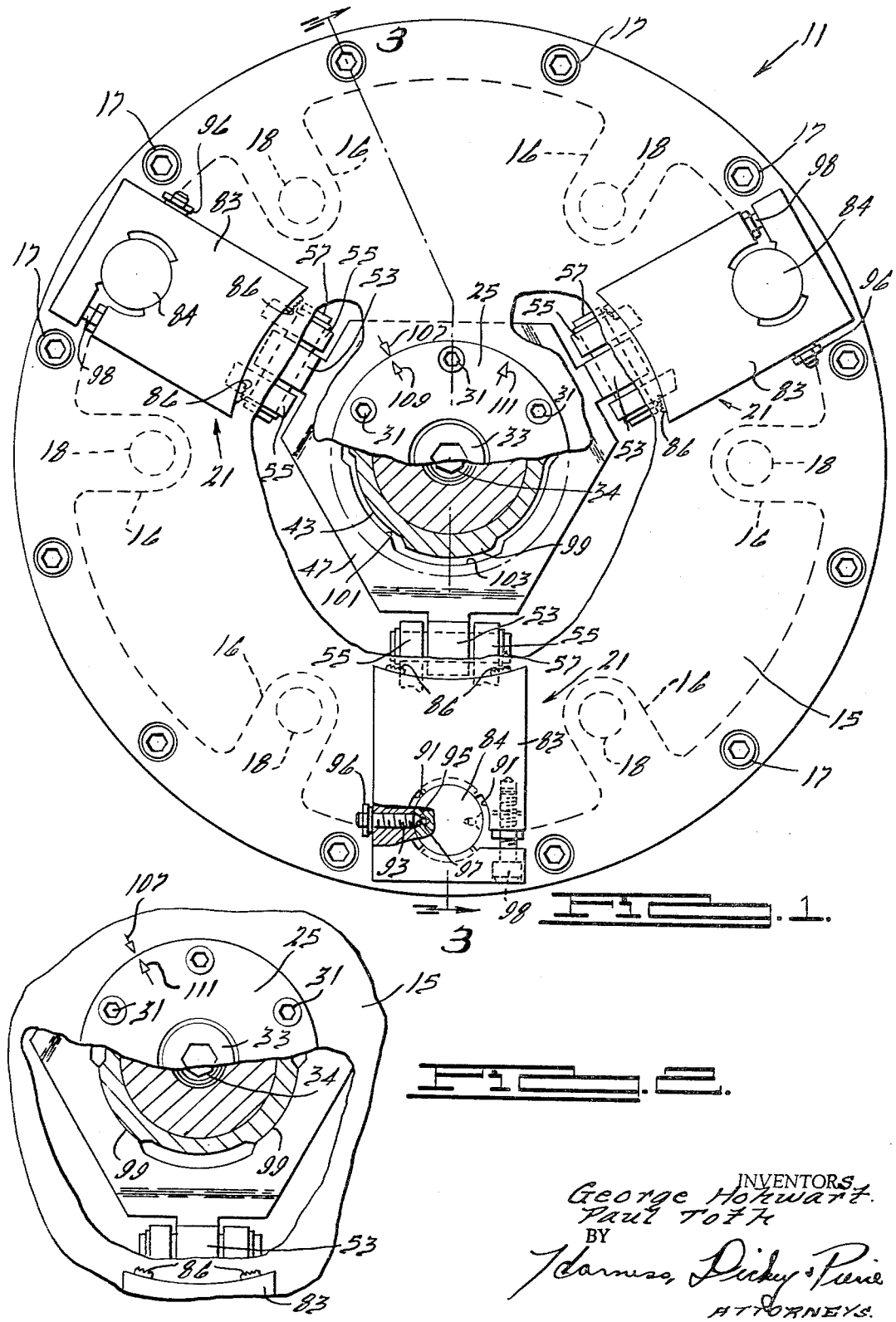

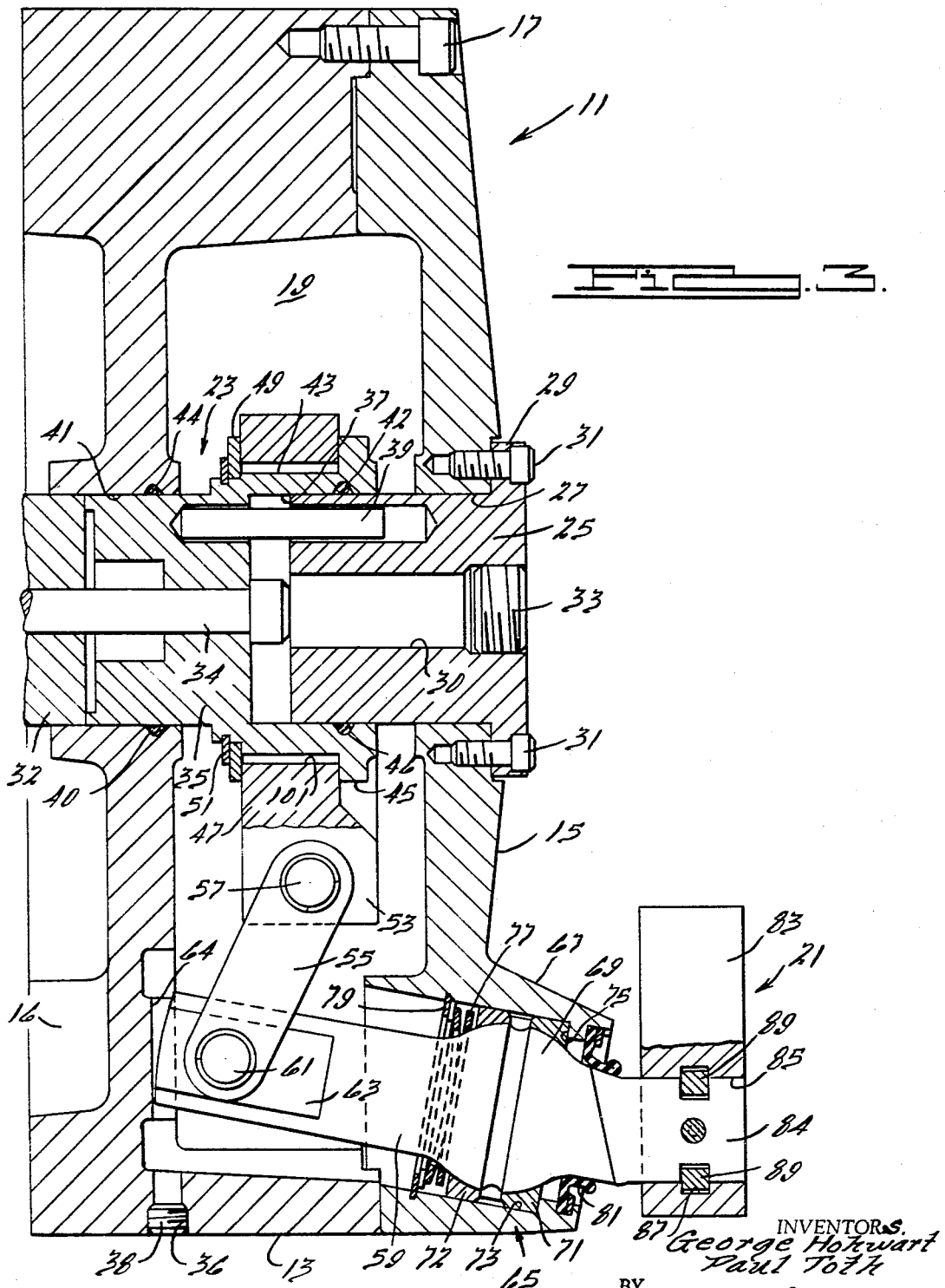

3,380,747
ADJUSTABLE COMPENSATING AND CENTRALIZING CHUCK
George Hohwart, Farmington, and Paul Toth, Allen Park, Mich., assignors to N. A. Woodworth Company, Ferndale, Mich., a corporation of Michigan
Continuation-in-part of application Ser. No. 420,660, Dec. 23, 1964. This application May 13, 1965, Ser. No. 455,431
17 Claims. (Cl. 279—106)

ABSTRACT OF THE DISCLOSURE

A chuck including a plurality of pivotally mounted arms, each having a gripping jaw movable radially relative to a central axis, an actuator movable along the axis, means operatively connecting the actuator and the arms comprising a spider carried by the actuator for axial movement therewith, the spider and actuator being relatively movable radially of the axis, and means for preventing relative radial movement between the spider and actuator and for holding the spider and actuator on the axis, the spider member interconnected with the arms whereby axial movement of the spider causes pivotal arm movement.

---

This application is a continuation-in-part of our copending application, Ser. No. 420,660, Filed Dec. 23, 1964, now abandoned.

This invention relates to chucks for gripping workpieces or the like and particularly to a highly versatile chuck of the type having a plurality of spaced jaw assemblies and which is readily convertible back and forth between a centralizing chuck; viz., one which aligns the axis of the workpiece with the axis of the chuck to a compensating chuck; viz., one which permits pilot location of a workpiece on a previously machined surface I.D. or O.D. while gripping securely on an out-of-round or eccentric surface thereof.

Chucks adapted to center a workpiece within the chuck to align their respective axes and insure accuracy of the work performed on the workpiece are known and commercially available as are chuck devices adapted to compensate for workpiece eccentricities and irregularities and obtain secure clamping thereof in a previous pilot location with equal clamping pressures between each of the jaws and the workpiece and no undesirable workpiece deformation. In the former, hereinafter referred to as centralizing chucks, a plurality of equidistantly spaced jaw assemblies jointly move equal radial distances toward and away from a longitudinal axis disposed centrally thereof. An actuator operatively engages each of the jaw assemblies and imparts movement thereto and to a workpiece engaged thereby to center the workpiece within the chuck. In the latter, hereinafter referred to as compensating chucks, similarly disposed jaw assemblies are movable toward and away from the chuck central axis to grip and release a workpiece. However, in these devices, the jaws are permitted to move different radial distances relative to the chuck central axis to compensate for workpiece eccentricities, irregularities or out of roundness and to obtain equal clamping pressure between each of the jaws and the workpiece.

Since both the centralizing and compensating type chucks described above have particular advantages and both have gained widespread independent use in industry today, manufacturers needing both types are required to purchase two different chucks and must provide independent or interchangeable installations for both types. This means higher initial maintenance and repair costs and more floor space needed, all of which results in a generally higher overall production cost.

In order to reduce the manufacturers' inventory as well as floor space needed for machine setup, a convertible chuck adapted to serve both as a centralizing and compensating chuck is particularly advantageous. In addition, in installations where these two types of chucks are interchanged, depending upon the particular type of workpiece or operation to be performed, a substantial reduction in down time can be realized by such a convertible chuck.

Accordingly, a principal object of the present invention is a chuck convertible from an arrangement adapted to center a workpiece within the chuck to an arrangement adapted to securely chuck a part located from a previously machined pilot diameter.

A further object of the present invention is a chuck of the above character having a plurality of equidistantly spaced jaw assemblies and which is easily convertible from one where the jaw assemblies move jointly equal radial distances relative to a central axis to one where the jaw assemblies are permitted to move different radial distances.

A further object of the present invention is a chuck of the above character wherein a single adjustment effects the conversion.

A further object of the present invention is a chuck of the above character which is relatively inexpensive to manufacture, rugged and compact in construction and reliable in operation.

These and other objects and advantages of the present invention will become more apparent from a consideration of the following detailed description and claims taken in conjunction with the drawings in which:

FIG. 1 is a front elevational view, partly broken away, of a chuck embodying the instant invention and showing the same adapted for use as a compensating chuck with the workpiece locating pilot not shown;

FIG. 2 is a fragmentary view similar to FIG. 1 but showing the chuck adapted for use as a centralizing chuck; and FIG. 3 is an enlarged sectional view taken on the line 3—3 of FIG. 1.

Broadly described, this invention includes a chuck having a selectively movable actuator carrying a spider member operatively connected to a plurality of spaced gripping jaws so that movement of the actuator and spider moves the jaws toward and away from a central axis. The actuator and spider are constructed and arranged so that in one arrangement, the spider is prevented from moving radially relative to the actuator and the jaws move jointly and equal radial distances relative to the central axis while in another arrangement, the spider can move radially on the actuator and the jaws are permitted to move different radial distances.

Referring now more specifically to the drawings, a chuck constructed according to the principles of the present invention is shown generally at 11 and includes a housing 13 having a removable cover 15 fixed thereto by screws 17, the housing and cover together defining a chamber 19. A plurality of embossments 16 formed on the housing 13 is provided with openings 18 therethrough for receiving screws (not shown) to removably fasten the housing 13 to a machine spindle (not shown). A plurality of jaw assemblies, indicated generally at 21, are each mounted for limited pivotal or swivel-type movement within the cover 15 and are motivated by an actuator assembly generally indicated at 23 and positioned within the chamber 19.

The actuator assembly 23 includes an outboard support or bearing 25 snugly received but angularly adjustable within an opening 27 formed in the cover 15. The support 25 has a radially outwardly extending flange 29 overlying the cover 15 and is removably fixed thereto by screws 31 and is provided with a center opening 30 to permit access to a screw 34 which removably fastens an actuator 35 to a drawbar 32. A threaded plug 33 closes the end of the center opening 30 in the support member 25.

The actuator 35 has an end socket 37 snugly receiving one end of the outboard support 25 and the support and actuator are nonrotatably connected as by a dowel pin 39. The other end of the actuator 35 extends through and snugly fits within an opening 41 formed in the housing 13 and is connected by screw 34 to the drawbar 32 which conventionally extends freely through the center of the tool spindle (not shown) to which the housing 13 is connected.

In use, the chamber 19 is at least partially filled with a lubricant through a threaded opening 36 normally closed by a plug 38 to minimize wear of the moving chuck parts. For this reason, it is important that the engaging faces of the housing 13 and cover 15, and the support 25 and cover 15 be accurately finished to provide a close fit and prevent fluid leakage. Conventional O-ring type seals 40 and 42 are disposed in grooves 44 and 46 in the opening 41 and the end socket 37, respectively, to sealingly engage the actuator 35 and the support 25 and prevent the flow of fluid therepast.

As perhaps best seen in FIG. 3, the actuator 35 has a generally cylindrical outer surface 43 terminated by a radially outwardly extending flange 45. A spider 47 surrounds the actuator surface 43 and is located by the flange 45 and by a retaining ring 49 and a snap ring 51 which permit relative angular adjustment or turning as well as relative radial movement between the spider 47 and the actuator 35.

The spider 47 is formed with a plurality of radially outwardly extending ears 53 radially aligned with each of the jaw assemblies 21 for operative connection therewith. As shown in FIG. 1, each of the ears 53 has a pair of links 55 pivotally attached thereto at one end by a pin 57. The other end of each pair of links 55 is pivotally connected to one end of a respective one of a plurality of rocker arms 59 by a pivot pin 61. As shown, the rocker arms 59 are each formed with flats 63 which are snugly but slidably received in radial slots 64 formed in the housing 13 and are mounted for swivel movement by a ball and socket assembly 65 disposed in bosses 67 formed in the cover 15. See FIG. 3.

The ball and socket assemblies 65 include a spherical ball portion 69 formed on each of the rocker arms 59 intermediate its ends and mounted for pivotal or swivel-type movement within a socket formed by opposed bearing races 71 and 72. Each of the bosses 67 has an opening 73 adapted to receive the races 71 and 72 and has a radially inwardly extending flange forming a shoulder 75 against which the race 71 abuts. A spring 77 held in place by a spring retainer plate 79 biases the race 72 and ball 69 toward the race 71 to compensate for small manufacturing tolerances in the ball and races. A resilient annular sealing member 81 is positioned within the outer end portion of each of the boss openings 73 and snugly engages the rocker arms 59 to keep dirt and other foreign matter out of the swivel joint.

Each of the rocker arms 59 carries a jaw 83 at its outer end 84. These jaws are provided with spaced work engaging surfaces 86 and preferably are mounted for limited rocking movement about the longitudinal axis of the rocker arm end 84. Thus, as shown in FIG. 3, the jaws 83 are each provided with a longitudinal bore 85 having an annular peripheral inner groove 87 intermediate the bore ends. The outer end 84 of each rocker arm 59 is formed with a pair of diametrically opposed peripheral keys or lugs 89 of a size to pass longitudinally through a pair of opposed longitudinal or axial ways 91 formed in the bore 85. Thus, the jaws 83 are slid on the ends 84 of the rocker arms 59 with the ways 91 and lugs 89 aligned. Thereafter the jaws 83 are turned to position the lugs 89 in the annular groove 87 between the ways 91. A set screw 93 having a conical tip 95 extends through the jaw 83 with the tip projecting into a conical cavity 97 in the jaw 83. The amount of rocking movement of each of the jaws 83 relative to the rocker arms 59 so that the jaw work engaging surfaces 86 adapt themselves to the surface of the workpiece as it engages the workpiece is determined by adjusting the screw 93. A lock nut 96 holds the set screw 93 in an adjusted position. A clamp screw 98 is tightened to hold the jaw 83 on the rocker arm 59 so as to prevent tipping thereof about an axis extending transversely of the arm 59. This screw 98 can be adjusted to either hold the jaw 83 in a fixed position on its arm 59 or to permit rocking movement of the jaw 83 on the arm within limits determined by the position of the set screw 93.

The rocker arms 59 are pivoted by axial movement of the actuator 35. Thus, as the actuator 35 is moved to the left as viewed in FIG. 3, the spider 47 is carried therewith by engagement with the flange 45, thereby swinging the inner ends of the links 55 rearwardly or to the left. This causes the outer end of each of the links 55 to be moved in an arcuate path having components directed forwardly or to the right and radially outwardly of the chuck resulting in the rocker arms 59 being pivoted with their outer ends 84 and the jaws 83 swinging radially inwardly of the chuck. Conversely, movement of the actuator 35 to the right, as viewed in FIG. 3, swings the links 55 and pivots the rocker arms 59 in the opposite direction thereby moving the jaws 83 radially outwardly.

According to the principles of the present invention, the rocker arms 59 and the jaws 83 either jointly move equal radial distances toward and away from the center of the chuck in the manner of a centralizing chuck, or the jaws 83 are permitted to move different radial distances relative to the chuck center in the manner of a compensating chuck. Thus, assuming that the links 55 are substantially identical in construction as well as their arrangement with and connection to the spider 47 and the rocker arms 59, if the spider 47 cannot move radially relative to the actuator 35 the rocker arms 59 are pivoted in unison and the jaws 83 are held to equal radial movements relative to the center of the chuck. However, if the spider 47 is permitted to move radially relative to the actuator 35, the rocker arms 59 and therefore the jaws 83 can move different radial distances relative to the center of the chuck.

As shown perhaps best in FIG. 1, the outer surface 43 of the actuator 35 is formed with a plurality of circumferentially spaced axially extending ribs 99. The spider 47 has an inner surface 101 formed with a plurality of circumferentially spaced axial grooves 103 located one between each adjacent pair of the ears 53 and adapted to be positioned opposite the ribs 99. The grooves 103 are preferably wider than the ribs 99 and the size of the actuator at the ribs 99 is substantially equal to the size of the spider surface 101 with some radial clearance therebetween to allow the actuator 35 to be turned relative to the spider 47. Thus, when the ribs 99 are positioned opposite the grooves 103 as shown in FIG. 1, the spider 47 and the actuator are permitted relative radial movement, the extent of which is determined by the relative diameters of the actuator at the ribs 99 and of the spider 47 at the grooves 103. By angularly adjusting or turning the actuator 35 relative to the spider 47 to bring the ribs 99 in contact with the spider surface 101 as shown in FIG. 2, relative radial movement between the actuator 35 and spider 47 is prevented.

In the former arrangement wherein the ribs 99 are opposite the grooves 103, the chuck operates as a compensating chuck and axial movement of the actuator 35 to the left, as seen in FIG. 3, imparts movement to the jaws 83 in a radially inward direction. If one or more of the jaws 83 contacts the workpiece before the others because of eccentricities, out of roundness or other irregularities of the surface of a workpiece previously located on a machined pilot diameter, this work contacting jaw or jaws remain stationary until the other jaw or jaws 83 contact the workpiece. This is accomplished by the spider 47 moving radially relative to the actuator 35 in a direction away from the jaw or jaws which are in contact with the workpiece and toward the jaw or jaws which have not yet contacted the workpiece. The result is that the work contacting jaws remain stationary and those not yet in contact with the workpiece are moved a greater radial distance toward the chuck center and the workpiece. When all the jaws are in contact with the workpiece, all the rocker arms 59 and jaws 83 thereafter move in unison to the final chucking position where the workpiece is gripped with equal pressure by each of the jaws.

When the ribs 99 contact the spider surface 101 as shown in FIG. 2, the device functions as a centralizing chuck and the spider 47 and actuator 35 are substantially rigid and are not relatively radially movable. By locating the grooves 103 intermediate the ears 53, the contacting spider surface 101 and actuator ribs 99 seen in FIG. 2 are radially aligned with the ears 53. Accordingly, as the jaws 83 grip the workpiece, the gripping forces exerted by jaws 38 are transmitted radially through the arms 59 to the links 55 and ears 53. These forces act to slightly deform the spider 47 at these areas, radially inwardly and remove any clearance between the actuator ribs 99 and the spider surface 101 thereby affording a higher degree of accuracy in centralizing the chucked workpiece. Thus, as the actuator 35 is moved to the left, as seen in FIG. 3, the rocker arms 59 and the jaws 83 move equal radial distances toward the chuck center to grip the workpiece and center it with its axis and the axis of the chuck coinciding.

To change the chuck device of the present invention from a cetralizing to a compensating chuck, or vice-versa, the support 25 is angularly adjusted or turned to similarly move the actuator 35 through the dowel pin 39. This is accomplished in the device of the present invention by first removing the plug 33 and the screws 31 which fix the support 25 to the cover 15. The screw 34 fixing the actuator 35 to the drawbar 32 is loosened by inserting a suitable wrench through the opening 32 and thereafter the support 25 and actuator 35 are turned to reposition the ribs 99 relative to the grooves 103. Thereafter, the screw 34 is retightened and the plug 33 and screws 31 reinserted. Preferably, the threaded openings in the cover 15 receiving the screws 31 are positioned to align with the openings in the support flange 29 in both the centralizing and compensating positions for the support and actuator. In addition, the cover memebr 15 may be marked with a pointer 107 or other suitable indicator which aligns with pointers 109 or 111 on the support 25 indicating the relative positions of the actuator ribs 99 and the grooves 103 and whether the chuck is set for centralizing or compensating operation.

By the present invention, there is provided a unitary chuck easily and rapidly convertible from centralizing to compensating operation and which requires only a single installation. While a preferred embodiment of the present invention has been illustrated and described above in detail, various additions, substitutions, modifications and omissions may be made thereto without departing from the spirit of the invention as encompassed by the appended claims.

What is claimed is:

1. In a chuck including a plurality of pivotally mounted arms, each having:
   a gripping jaw movable radially relative to a central axis,
   an actuator movable along said axis, and
   means operatively connecting said actuator and said arms comprising:
   a spider carried by said actuator for axial movement therewith said spider and actuator being relatively movable radially of said axis,
   means for preventing relative radial movement between said spider and actuator and for holding said spider and actuator on said axis,
   said spider member interconnected with said arms whereby axial movement of said spinder causes pivotal arm movement.

2. In a chuck including a plurality of pivotally mounted arms, each having:
   a gripping saw movable radially inwardly relative to a central axis to grip a workpiece,
   an actuator movable along said axis, and
   means operatively connecting said actuator and said arms comprising
   a spider carried by said actuator for axial movement therewith with said actuator and spider being relatively angularly adjustable, said spider member interconnected with said arms whereby axial movement of said spider causes pivotal arm movement,
   said actuator and said spider being so formed that in a first angular position, said spider is movable in a plane transverse to said central axis and in a second angular position, relative movement between said actuator and said spider in said plane is precluded.

3. In a chuck including a plurality of pivotally mounted arms, each having:
   a gripping jaw movable radially inwardly relative to a central axis, to grip a workpiece
   an actuator movable along said axis, and
   means operatively connecting said actuator and said arms comprising:
   a spider carried by said actuator for axial movement therewith with said actuator and spider being relatively angularly adjustable, said spider member interconnected with said arms whereby axial movement of said spider causes pivotal arm movement,
   said actuator and said spider being so formed that in a first angular position, said spider is movable in a plane transverse to said central axis and in a second angular position, the gripping forces on said jaws are transmitted through said arms to said spider to remove any clearance between confronting surfaces of said spider and said actuator and relative movement between said actuator and said spider in said plane is precluded.

4. In a chuck including a plurality of pivotally mounted arms, each having:
   a gripping jaw movable radially relative to a central axis,
   an actuator having a generally cylindrical surface and movable along said axis, and
   means operatively connecting said actuator and said arms comprising:
   an annular spider carried by said actuator upon said surface for axial movement therewith with said actuator and spider being relatively angularly adjustable,
   said spider member interconnected with said arms whereby axial movement of said spider causes pivotal arm movement,
   said actuator surface having at least one axial rib formed thereon,
   said spider having at least one arcuate groove adapted for receiving said rib,
   said actuator and said spider being of a generally complementary configuration in the areas of said rib and said groove,
   said groove having a radial dimension at least substantially equal to the radial dimension of said rib.

5. In a chuck including a plurality of pivotally mounted arms, each having:

a gripping jaw movable radially relative to a central axis, an actuator having a generally cylindrical surface and movable along said axis, and means operatively connecting said actuator and said arms comprising:

an annular spider carried by said actuator upon said surface for axial movement therewith with said actuator and spider being relatively angularly adjustable, said spider member interconnected with said arms whereby axial movement of said spider causes pivotal arm movement, said actuator surface having at least one axial rib formed thereon, said spider having at least one arcuate groove circumferentially aligned with one of said arms and adapted for receiving said rib, said actuator and said spider being of a generally complementary configuration in the areas of said rib and said groove, said groove having a radial dimension at least substantially equal to the radial dimension of said rib.

6. In a chuck including:

a housing, a plurality of equidistantly spaced arms pivotally mounted within said housing and each having a gripping jaw fixed thereto for movement inwardly and outwardly relative to a central axis, an actuator mounted within said housing and movable along said axis, and means operatively connecting said actuator and said arms comprising:

a spider carried by said actuator for axial movement therewith with said actuator and spider being relatively angularly adjustable, said spider member interconnected with said arms whereby axial movement of said spider causes pivotal arm movement, said actuator and said spider being so formed that in a first relative angular position, said spider is movable in a plane transverse to said central axis and in a second relative angular position, relative movement between said actuator and said spider in said plane is precluded.

7. In a chuck including:

a housing, a plurality of equidistantly spaced arms pivotally mounted within said housing and each having a gripping jaw fixed thereto for movement inwardly and outwardly relative to a central axis, a support releasably retained within said housing and angularly adjustable therein, an actuator slidably and nonrotatably disposed upon said support and movable along said axis, and means operatively connecting said actuator and said arms comprising:

a spider carried by said actuator for axial movement therewith with said actuator and spider being relatively angularly adjustable, said spider interconnected with said arms whereby axial movement of said spider causes pivotal arm movement, said actuator and said spider being so formed that in a first relative angular position, said spider is movable in a plane transverse to said central axis and in a second relative angular position, relative movement between said actuator and said spider in said plane is precluded.

8. In a chuck including:

a housing, a plurality of equidistantly spaced arms pivotally mounted within said housing and each having a gripping jaw fixed thereto for movement inwardly and outwardly relative to a central axis, a support releasably retained within said housing and angularly adjustable therein, an actuator slidably and nonrotatably disposed upon said support member having a generally cylindrical surface and movable along said axis, and means operatively connecting said actuator and said arms comprising:

an annular spider carried by said actuator upon said surface for axial movement therewith with said actuator and spider being relatively angularly adjustable, said spider interconnected with said arms whereby axial movement of said spider causes pivotal arm movement, said actuator surface having at least one axial rib formed thereon, said spider having at least one arcuate groove adapted for receiving said rib, said actuator and said spider being of a generally complementary configuration in the areas of said rib and said groove, said groove having a radial dimension at least substantially equal to the radial dimension of said rib.

9. In a chuck including a plurality of pivotaly mounted arms each having:

a gripping jaw fixed thereto for movement inwardly and outwardly relative to a central axis, an actuator movable along said axis, and means operatively connecting said actuator and said arms comprising:

a spider carried by said actuator for axial movement therewith with said actuator and spide being relatively angularly adjustable, a plurality of links each pivotally connected to said spider and to a respective one of said arms whereby axial movement of said spider causes pivotal arm movement, said actuator and said spider being so formed that in a first relative angular position, said spider is movable in a plane transverse to said central axis and in a second relative angular position, relative movement between said actuator and said spider in said plane is precluded.

10. In a chuck including a plurality of pivotally mounted arms each having:

a gripping jaw fixed thereto for movement inwardly and outwardly relative to a central axis, an actuator having a generally cylindrical surface and movable along said axis, and means operatively connecting said actuator and said arms comprising:

an annular spider carried by said actuator upon said surface for axial movement therewith with said actuator and spider being relatively angularly adjustable, a plurality of links each pivotally connected to said spider and to a respective one of said arms, whereby axial movement of said spider causes pivotal arm movement, said actuator surface having at least one rib formed thereon, said spider having at least one arcuate groove adapted for receiving said rib, said actuator and said spider being of a generally complementary configuration in the areas of said rib and said groove, said groove having a radial dimension at least substantially equal to the radial dimension of said rib.

11. In a chuck including:

a housing, a plurality of equidistantly spaced arms pivotally mounted within said housing and each having a gripping jaw fixed thereto for movement inwardly and outwardly relative to a central axis, an actuator mounted within said housing and movable along said axis, and means operatively connecting said actuator and said arms comprising:
- a spider carried by said actuator for axial movement therewith with said actuator and spider being relatively angularly adjustable,
- a plurality of links each pivotally connected to said spider and to a respective one of said arms,
- whereby axial movement of said spider causes pivotal arm movement,
- said actuator and said spider being so formed that in a first relative angular position, said spider is movable in a plane transverse to said central axis and in a second relative angular position, relative movement between said actuator and said actuator and said spider in said plane is precluded.

12. In a chuck including:

a housing, a plurality of equidistantly spaced arms pivotally mounted within said housing and each having a gripping jaw fixed thereto for movement inwardly and outwardly relative to a central axis, a support releasably retained within said housing and angularly adjustable therein, an actuator slidably and nonrotatably disposed upon said said support and movable along said axis, and means operatively connecting said actuator and said arms comprising:
- a spider carried by said actuator for axial movement therewith with said actuator and spider being relatively angularly adjustable,
- a plurality of links each pivotally connected to said spider and to a respective one of said arms whereby axial movement of said spider causes pivotal arm movement,
- said actuator and said spider being so formed that in a first relative angular position, said spider is movable in a plane transverse to said central axis and in a second relative angular position, relative movement between said actuator and said spider in said plane is precluded.

13. In a chuck including:

a housing, a plurality of equidistantly spaced arms pivotally mounted within said housing and each having a gripping jaw fixed thereto for movement inwardly and outwardly relative to a central axis, a support releasably retained within said housing and angularly adjustable therein, an actuator slidably and nonrotatably disposed upon said support having a generally cylindrical surface and movable along said axis, and means operatively connecting said actuator and said arms comprising:
- an annular spider carried by said actuator upon said surface for axial movement therewith with said actuator and spider being relatively angularly adjustable,
- a plurality of links each pivotally connected to said spider and to a respective one of said arms whereby axial movement of said spider causes pivotal arm movement,
- said actuator surface having at least one rib formed thereon,
- said spider having at least one arcuate groove adapted for receiving said rib,
- said actuator and said spider being of a generally complementary configuration in the areas of said rib and said groove,
- said groove having a radial dimension at least substantially equal to the radial dimension of said rib.

14. In a chuck including:

a housing, a plurality of equidistantly spaced arms pivotally mounted within said housing and each having a gripping jaw fixed thereto for movement inwardly and outwardly relative to a central axis, a support releasably retained within said housing and angularly adjustable therein.

an actuator slidably and nonrotatably disposed upon said support having a generally cylindrical surface and movable along said axis, and means operatively connecting said actuator and said arms comprising:
- an annular spider carried by said actuator upon said surface for axial movement therewith with said actuator and spider being relatively angularly adjustable,
- a plurality of links each pivotally connected to said spider and to a respective one of said arms whereby axial movement of said spider causes pivotal arm movement,
- said actuator surface having at least one rib formed thereon,
- said spider having at least one arcuate groove radially aligned with one of said arms and adapted for receiving said rib,
- said actuator and said spider being of a generally complementary configuration in the areas of said rib and said groove,
- said groove having a radial dimension at least substantially equal to the radial dimension of said rib.

15. In a chuck including a plurality of pivotally mounted arms, each having:

a gripping jaw movable radially relative to a central axis, an actuator having a generally cylindrical surface and movable along said axis, and means operatively connecting said actuator and said arms comprising:
- an annular spider carried by said actuator upon said surface for axial movement therewith with said actuator and spider being relatively angularly adjustable,
- said spider member interconnected with said arms whereby axial movement of said spider causes pivotal arm movement,
- said actuator surface having a plurality of axial ribs formed thereon,
- said spider having a plurality of arcuate grooves adapted for receiving respective ones of said ribs,
- said actuator and said spider being of a generally complementary configuration in the areas of said rib and said groove,
- said grooves having a radial dimension at least substantially equal to the radial dimension of said ribs.

16. In a chuck including three pivotally mounted arms, each having:

a gripping jaw movable radially relative to a central axis, an actuator having a generally cylindrical surface and movable along said axis, and means operatively connecting said actuator and said arms comprising:
- an annular spider carried by said actuator upon said surface for axial movement therewith with said actuator and spider being relatively angularly adjustable,
- said spider member interconnected with said arms whereby axial movement of said spider causes pivotal arm movement, said actuator surface having three equidistantly spaced axial ribs formed thereon, said spider having three equidistantly spaced arcuate grooves adapted for receiving respective ones of said ribs, said actuator and said spider being of a generally complementary configuration in the areas of said rib and said groove, said grooves having a radial dimension at least substantially equal to the radial dimension of said ribs.

17. In a chuck including three pivotally mounted arms, each having:

a gripping jaw movable radially relative to a central axis, an actuator having a generally cylindrical surface and movable along said axis, and means operatively connecting said actuator and said arms comprising:

an annular spider carried by said actuator upon said surface for axial movement therewith with said actuator and spider being relatively angularly adjustable, said spider member interconnected with said arms whereby axial movement of said spider causes pivotal arm movement, said actuator surface having three equidistantly spaced axial ribs formed thereon, said spider having three equidistantly spaced arcuate grooves radially aligned with a respective one of said arms and adapted for receiving respective ones of said ribs, said actuator and said spider being of a generally complementary configuration in the areas of said rib and said groove, said grooves having a radial dimension at least substantially equal to the radial dimension of said ribs.

References Cited
UNITED STATES PATENTS

| | | | |
|---|---|---|---|
| 2,867,443 | 1/1959 | Swanson | 279—119 |
| 3,082,015 | 3/1963 | Hobwart | 279—118 |

OTHELL M. SIMPSON, *Primary Examiner.*

ROBERT C. RIORDON, *Examiner.*

J. C. PETERS, E. A. CARPENTER, *Assistant Examiners.*